United States Patent [19]

Usui

[11] Patent Number: 5,809,347
[45] Date of Patent: Sep. 15, 1998

[54] MOTION COMPENSATION DEVICE TO COMPENSATE FOR MOTION DUE TO HAND MOVEMENT

[75] Inventor: Kazutoshi Usui, Kawasaki, Japan

[73] Assignee: Nikon Corporation, Tokyo, Japan

[21] Appl. No.: 710,121

[22] Filed: Sep. 12, 1996

[30]     Foreign Application Priority Data

Sep. 14, 1995   [JP]   Japan .................................. 7-236888

[51] Int. Cl.⁶ ...................................................... G03B 5/00
[52] U.S. Cl. .............................................................. 396/53
[58] Field of Search .............................. 396/53, 55, 52; 348/208; 359/554–557

[56]             References Cited

U.S. PATENT DOCUMENTS

| | | | |
|---|---|---|---|
| 4,970,540 | 11/1990 | Vasey et al. ............................... | 396/53 |
| 5,266,988 | 11/1993 | Washisu ..................................... | 354/70 |
| 5,335,032 | 8/1994 | Onuki et al. ............................... | 396/53 |
| 5,389,997 | 2/1995 | Ohishi ........................................ | 354/430 |
| 5,402,197 | 3/1995 | Okano et al. ............................. | 254/400 |
| 5,416,558 | 5/1995 | Katayama et al. ...................... | 354/446 |
| 5,444,509 | 8/1995 | Ohishi ........................................ | 354/202 |

FOREIGN PATENT DOCUMENTS

| | | |
|---|---|---|
| 2-66536 | 3/1990 | Japan . |
| 5-142615 | 6/1993 | Japan . |

*Primary Examiner*—W. B. Perkey

[57]               ABSTRACT

A device used in an optical system such as a camera that makes it possible to perform suitable motion compensation, even during panning. The device includes a motion detection unit which detects motion, a motion compensation optical system which compensates for image motion, a motion compensation drive unit which drives the motion compensation optical system, a motion compensation control unit which calculates, from the output of the motion detection unit, a target position signal of the motion compensation optical system, and based on this target position signal, controls the motion compensation drive unit, a position detection unit which detects the position of the motion compensation optical system, and a center bias calculating unit which, based on the position data obtained from the position detection unit, corrects the target position signal towards the center of possible movement of the motion compensation optical system.

11 Claims, 9 Drawing Sheets

MOTION COMPENSATION DEVICE TO COMPENSATE FOR MOTION DUE TO HAND MOVEMENT

CROSS REFERENCE TO RELATED APPLICATIONS

This application is based upon and claims priority from Japanese Patent Application 07-236888 filed Sep. 14, 1995, the contents of which are incorporated herein by reference.

BACKGROUND OF THE INVENTION

1. Field of the Invention

The present invention relates to a motion compensation device which compensates for image motion due to hand movements and the like in an optical device. More particularly, the invention relates to an image blur compensation device that functions with photographic cameras.

2. Description of the Related Art

Image blur suppression devices have as their object, suppression of, or reduction of blurring in an image projected onto an image plane. A motion compensation device is a type of image blur suppression device that compensates for motion incident upon an optical system, which projects the image onto the image plane. Motion is typically imparted to the optical system by way of vibrations in the optical system, or in the surrounding holding member. In general, known motion compensation devices cause a compensation lens to shift counter to the motion of the optical system so as to shift the image projected by the optical system relative to the optical system.

FIGS. 7 and 8(a) and 8(b) are schematic diagrams which illustrate the image blurring motion of a camera.

Blurring motion of camera 1 has six degrees of freedom: pitch, yaw and roll motions are the three degrees of freedom of rotational motion, and the three degrees of freedom of translational motion are in the X, Y and Z directions.

Among these, the autofocus (AF) mechanism takes charge in relation to translational motion in the Z direction, in which compensation by a blurring motion compensation device is not necessary. Moreover, in relation to rolling, the center of this rotational motion is within the camera, and because it has only a slight degrading effect on the image, no particular description is given in this specification of blurring motion compensation with respect to rolling. Furthermore, translational motion in the X and Y directions becomes a problem in the case of high photographic magnifications, but in this specification, the compensation of translational motion will not be described.

The image blurring motion of the camera 1 is normally monitored by an angular velocity sensor 3. The angular velocity sensor 3 uses a piezoelectric type of angular velocity sensor to detect Coriolis forces arising due to normal rotation. Two angular velocity sensors 3 are used, to detect pitch blurring motions and yaw blurring motions.

The blurring motion compensation method when pitching of the camera occurs will next be described with reference to FIGS. 8(a) and 8(b).

FIG. 8(a) is a schematic diagram of the camera 1 when there is no blurring motion. The subject A forms an image on the film plane at B via a blurring motion compensation optical system 2 (hereinafter "blurring motion compensation lens").

FIG. 8(b) is a schematic diagram of the camera 1 when pitching has occurred. In the case that pitching of the camera 1 has occurred, the image which was at B on the film plane 8 has moved to B'. This is blurring motion on the film surface. It is possible to compensate for this blurring motion by driving blurring motion compensation lens 2 in a direction perpendicular to the optical axis of the camera.

As prior art blurring motion compensation devices, in order to compensate at the time of photography for blurring motion arising due to vibration of the camera, it is known to move a portion of the photographic lens (hereinafter "blurring motion compensation lens") in a direction at right angles to the optical axis as disclosed in Japanese Laid-Open Patent Publications JP-A-2-66536 and JP-A-3-186826.

FIG. 9 is a block diagram showing an example of a prior art blurring motion compensation device. FIGS. 10(a)–(d) are graphs which illustrate the blurring motion compensation operation.

This blurring motion compensation device converts blurring motion data (angular velocity data) detected by the angular velocity sensor 3 into target position data of the blurring motion compensation lens 2.

First, extraction is performed of low frequency component 101a of angular velocity data 101, by low frequency component extraction unit 51. In FIG. 10(a), the solid line shows the angular velocity data 101 arising due to camera blurring motion. Moreover, the broken line is the low frequency component 101a extracted from this angular velocity component 101. The angular velocity data 101, by subtraction of the low frequency component 101a, is converted into the effective angular velocity component 101b for which it is necessary to compensate as disclosed in Japanese Laid-Open Patent Publication JP-A-5-142615.

The effective angular velocity component 101b, integrated by integrating circuit 53, is converted into angle data 101c. This angle data 101c is converted into target position data 105 of the blurring motion compensation lens 2 by the target position conversion unit 54, with the addition of focal distance data 102, subject range data 103, and lens data 104.

FIG. 10(b) is a graph showing the target position data of the blurring motion compensation lens 2 obtained in this manner. The arrows in the Figure indicate the state (ON/OFF) of the blurring motion compensation switch.

Target position data 105, because it is not necessary before the blurring motion compensation control is set ON, is a fixed value. Similarly, it also becomes a fixed value after the blurring motion compensation control is set OFF.

Control unit 55 determines drive voltage 107 to perform control of the blurring motion compensation lens 2, based on this target position data 105 and on present lens position data 106.

FIG. 10(c) is a graph showing the lens position of the blurring motion compensation lens 2 while being controlled. FIG. 10(d) is a graph showing the control current which was supplied to the blurring motion compensation drive unit.

The control unit 55, when the blurring motion compensation control becomes ON, commences follow-up control to the target position data 105. As shown in FIG. 10(d), the drive current becomes necessarily a very large drive current immediately after the control has become "ON". The reason for this is because the target position data suddenly rises with respect to the actual lens position, the deviation between the target position data 105 and the actual position data 106 instantaneously becomes large, and the control unit 55 causes a drive current to flow in order to instantaneously make up for this deviation. This rush of current at the control "ON" time is generally greater than the drive current during control, and it is necessary to perform a design of the camera's electrical system with a view to handling this current.

Moreover, the control unit 55, in the case that the remaining battery power is small, cannot effect follow-up control because the control unit cannot cause the current to flow.

The control unit 55, when the blurring motion compensation control becomes "OFF", drops the drive power out and ends the blurring motion compensation control. At this time, as shown in FIG. 10(c), the blurring motion compensation lens 2, because it is suddenly deprived of drive force, exhibits simple harmonic motion as it returns close to the neutral point. The reason for this is that it was pulled by some drive force, which suddenly disappears, with respect to the spring which urges the blurring motion compensation lens 2 to the center.

Because of this, just as the photographer switches the blurring motion compensation control switch "OFF", a large blurring motion of the subject in the viewfinder begins.

The photographer may also perform panning photography in order to follow a moving subject. In the case where panning is performed, the blurring motion compensation lens 2 is controlled such as to become stationary with respect to space, but when the blurring motion compensation lens 2 begins to displace from the center of its range of movement, gain control unit 52 acts to perform control of the angular velocity data. As a result, the blurring motion compensation lens 2 during panning, due to the control of the angular velocity data, can stop within the movement range, unaffected by the panning angular velocity.

However, during panning, because the angular velocity data is controlled, appropriate blurring motion compensation could not be performed.

SUMMARY OF THE INVENTION

It is an object of the present invention to solve the problems discussed above. This object and other objects of the present invention are achieved by a motion compensation device comprising a motion detection unit to detect motion, a motion compensation optical system to compensate for image motion, a position detecting unit to detect a position of the motion compensation optical system, a motion compensation drive unit to drive the motion compensation optical system, a motion compensation control unit to calculate, from output of the motion detection unit, a target position signal of the motion compensation optical system, and based on the target position signal, to control the motion compensation drive unit, and a center bias calculation unit to correct, based on the position data obtained from the position detection unit, the target position signal towards a center of possible movement of the motion compensation optical system.

Moreover, further objects are achieved by a motion compensation device further comprising a low frequency extraction unit to extract low frequency components from output of the position detection unit, and an angular velocity compensation amount calculating unit to correct, based on output of the center bias calculation unit, the output of the low frequency extraction unit.

Yet further objects of the present invention are achieved by a motion compensation device wherein the center bias calculation unit stops functioning during an exposure.

Additional objects and advantages of the invention will be set forth in part in the description which follows and, in part, will be obvious from the description, or may be learned by practice of the invention.

BRIEF DESCRIPTION OF THE DRAWINGS

These and other objects, features, and characteristics of the present invention will become apparent to one skilled in the art to which the present invention pertains from a study of the following detailed description and the appended claims and drawings, all of which form a part of this specification. In the drawings:

DETAILED DESCRIPTION OF THE PREFERRED EMBODIMENTS

Figure 1A:
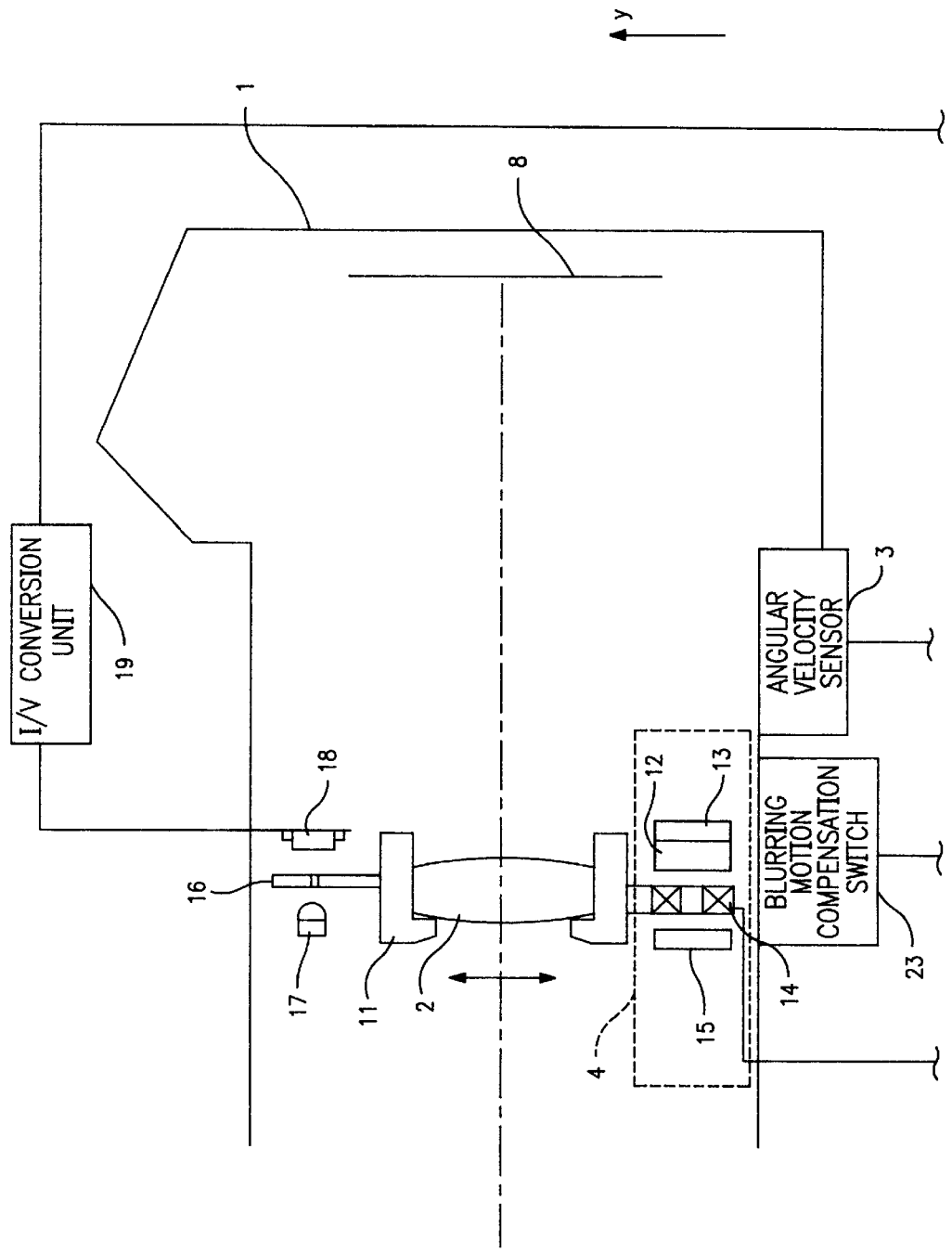
FIGS. 1(a) and (b) are diagrams showing a first preferred embodiment of a blurring motion compensation device for a camera according to the present invention.

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

Figure 1B:
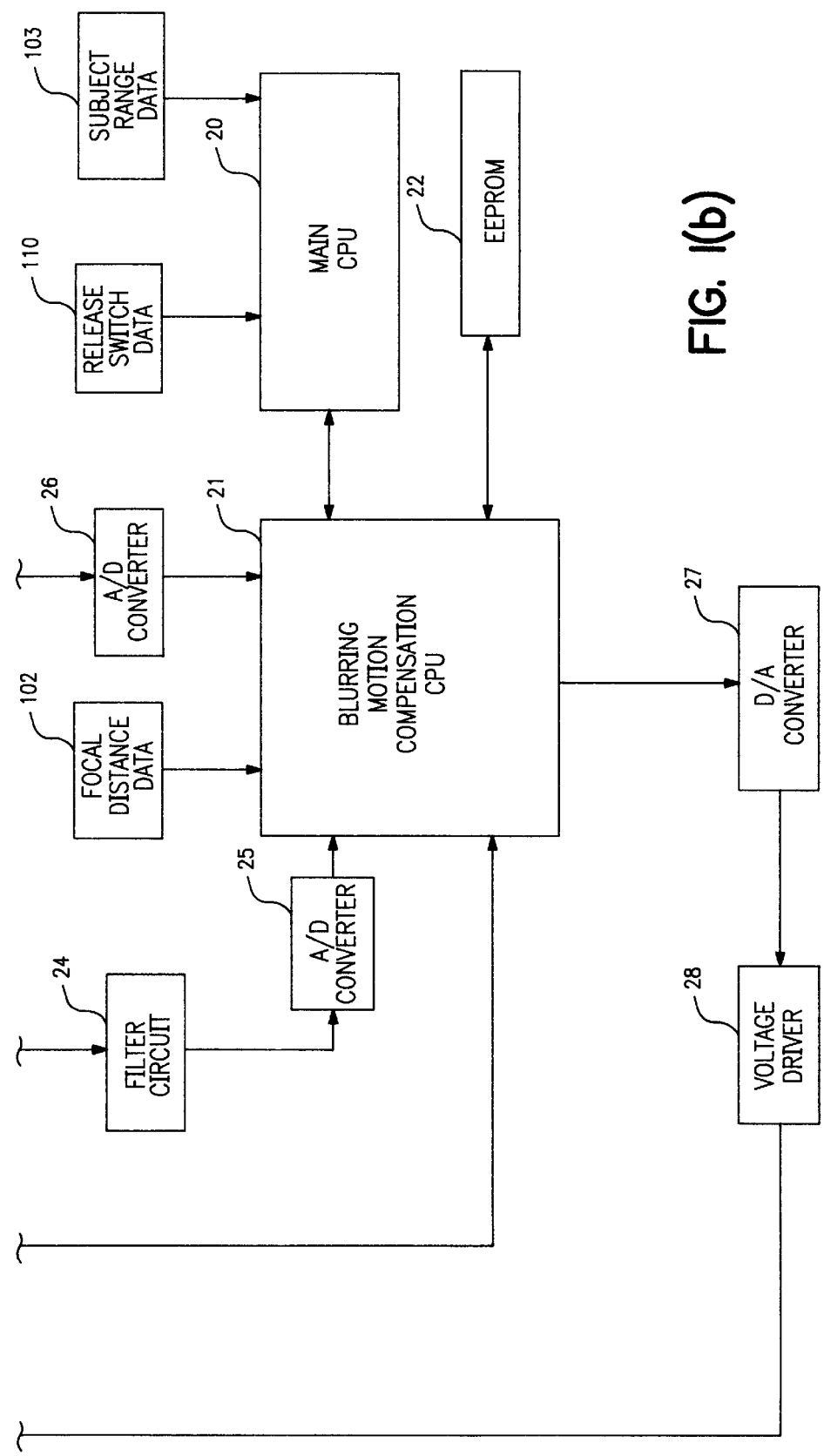

FIGS. 1(a) and 1(b) are diagrams showing a first embodiment of a blurring motion compensation device suitable for a camera according to the present invention. Moreover, the description is here focused particularly on a pitch direction system.

In the case that a pitching motion of camera 1 has occurred, the pitching angular velocity is monitored by angular velocity sensor 3. The signal of the angular velocity sensor 3 passes through a filter circuit 24 which cuts out high frequency noise.

The reason for arranging the filter circuit 24 as illustrated is as follows.

Two angular velocity sensors 3 are required in the case of detecting the angular velocity of the camera, in order to know the pitch angular velocity and the yaw angular velocity. In this embodiment, a piezoelectric vibration type of sensor is used as the angular velocity sensor 3, in which a vibrator is caused to vibrate, and the angular velocity is found by detecting the Coriolis force which adds to this vibrator. The excitation frequency of this vibrator is a very high frequency of 20 kHz, but in order to prevent mutual interference of these two sensors, the excitation frequencies of the two sensors have an offset of a few hundred Hz to a few kHz. However, by offsetting the frequencies in this manner, the mutual interference of the sensors is mitigated, but undulations of the frequencies may be generated. Consequently, in order to prevent this undulation, the filter circuit 24 is arranged as a low pass filter.

The signal of the angular velocity sensor 3, having passed through the filter circuit 24, is digitized by an A/D converter 25, and is input to a blurring motion compensation CPU 21. The blurring motion compensation CPU 21, based on the input data, forms target position data 105 (FIG. 3), using focal distance data 102 of the lens, subject range data 103 sent from a main CPU 20, lens data stored in an EEPROM 22, and the like.

A position detection element 18 is an element that detects the position of a blurring motion compensation lens 2. The position signal from blurring motion compensation lens 2 is converted into a voltage by an current-to-voltage (I/V) conversion unit 19. The position signal from the blurring motion compensation unit is input to the blurring motion compensation CPU 21 via an A/D converter 26. The blurring motion compensation CPU 21 forms a control signal such that the difference is made small between the two signals comprising the target position data 105 of the blurring motion compensation lens 2 obtained from the angular velocity sensor 3 and the actual position data 106 (FIG. 3), which indicates the actual position of the blurring motion compensation lens 2.

The control signal is converted to analog by a D/A converter 27, and is input to a voltage driver 28. The voltage driver 28 receives the control signal and performs the driving of a blurring motion compensation drive unit 4 (see FIG. 2) in order to drive the blurring motion compensation lens 2.

Furthermore, the release SW data 110 (FIG. 3) and the subject range data 103 are input to the main CPU 20.

Proceeding in this manner, by driving the blurring motion compensation lens 2, even if pitching of the camera occurs, it becomes possible for the image position to be kept constant. Moreover, although not shown in the drawing, a similar system is arranged in order to compensate for yawing.

Moreover, the blurring motion compensation switch 23 is a switch used in order to select operation or non-operation of the blurring motion compensation device. The output from switch 23 is connected to the blurring motion compensation CPU 21. Furthermore, release SW data 110 (FIG. 3) and battery check (BC) voltage data 111 (FIG. 3) are input to the main CPU 20.

A description will next be given of the structure of a blurring motion compensation unit 4 to drive the blurring motion compensation lens 2. As shown in FIG. 1(a), the blurring motion compensation unit is constituted by a coil 14, magnet 12, and yokes 13 and 15.

Figure 2:
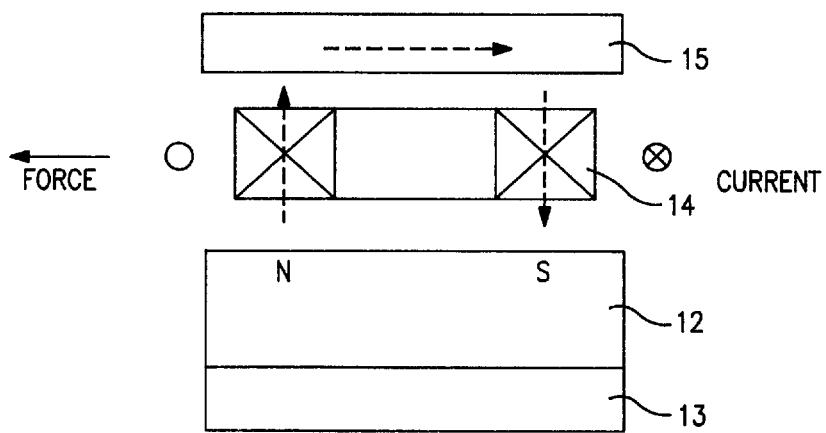
FIG. 2 is a block diagram showing details of the blurring motion compensation drive unit according to the first preferred embodiment of the present invention.

FIG. 2 is a block diagram showing details of the blurring motion compensation unit for the blurring motion compensation device according to the first embodiment.

In FIG. 2, the magnet 12 is magnetized in a two-pole polarity. The yokes 13 and 15 are made of iron and the like high permeability materials. The coil 14 is wound with the optical axis direction as a center.

The magnet 12, because it is magnetized in this two-pole polarity, is mounted on the yoke 13 by the magnetic force. The yoke 15, situated opposite the magnet 12, is mounted such that the coil 14 lies therebetween. At this time, by the magnet 12 and the yokes 13 and 15, a magnetic circuit is formed as shown by the dashed arrows in FIG. 2. The coil 14, because it is located in these lines of magnetic force by applying a current flowing in the coil 14, according to Fleming's left-hand law, generates a magnetic force in a direction at right angles to the direction in which the current flows and the direction of the magnetic lines of force.

Accordingly, in the case in which the magnet 12 and coil 14 are arranged as shown in FIG. 1 (a), a force comes to be generated in the Y axis direction.

The movement of the blurring motion compensation lens 2 is monitored by optical position detection devices 18, which are respectively arranged for the x-axis direction and the y-axis direction. Position Sensitive Devices (PSDs), which are compound type photodiodes, are usually used as the optical position detection devices 18 (termed PSD 18 hereafter).

A lens compartment 11 serves to fix the blurring motion compensation lens 2, and a slit 16 is mounted on the lens compartment. This slit 16 is made of a composite member which reflects infrared light.

In FIG. 1(a), the light emitted by an infrared light emitting diode (IRED) 17 passes through the slit 16 mounted on the lens compartment 11 and is incident on the one-dimensional PSD 18 for position detection use. Because the slit 16 is mounted on the lens compartment 11, the movement of the blurring motion compensation lens 2 corresponds to the movement of the light incident on the PSD 18. The position of the blurring motion compensation lens 2 can be detected in this manner.

Figure 3:
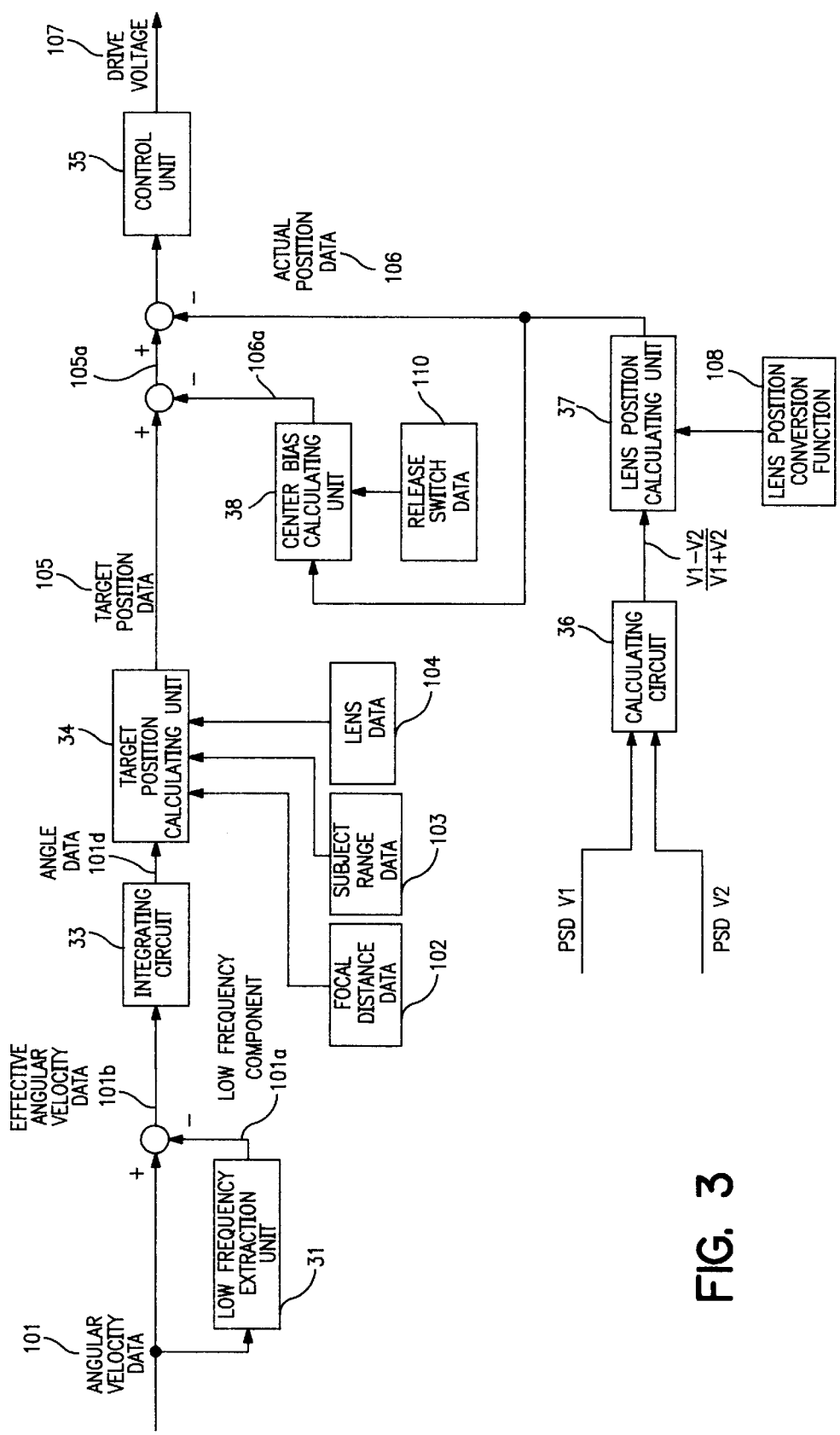
FIG. 3 is a block wiring diagram showing the blurring motion compensation device of the first preferred embodiment of the present invention.

The process of the blurring motion compensation CPU will next be described. FIG. 3 is a block diagram showing the blurring motion compensation device of this embodiment.

After the angular velocity data 101 has been introduced via the A/D converter 25, the low frequency component 101a of the blurring motion angular velocities of the camera is initially extracted from the angular velocity data 101 by a low frequency extraction unit 31. The effective angular velocity data 101b is obtained by subtracting the low frequency component 101a from this angular velocity data 101.

The reason for extracting the low frequency component is as follows. The output voltage of the angular velocity sensor 3 when the camera is stationary is an individual error. This voltage is also dispersed according to the environment of use. Moreover, in the case that the photographer, following a subject, performs panning photography, when this panning angular velocity is not made 0, the subject cannot be followed. This is because, in the case that control of the blurring motion compensation lens 2 was performed with the angular velocity output as 0 when stationary, moving so as to be stationary with respect to space, the blurring motion compensation lens does not follow the movement of the camera following a subject.

In the extraction method of the low frequency components, there are the method of averaging the angular velocity data in each fixed time, or finite input response (FIR), infinite input response (IIR) and the like digital filtering methods. However, in the extraction of the low frequency components, time is required that is equal to the period of the low frequency components that are found. The effective angular velocity signal 101b, with respect to the ideal motion of the camera, after the low frequency component 101a of the angular velocity has been found, can be obtained by subtracting this low frequency component 101a from the initial angular velocity signal 101.

The angular velocity signal obtained in this manner, integrated by an integrating circuit 33, is converted into angle data 101d. This angle data 101d, by using the target position conversion unit 34, which performs a calculation with the inclusion of the focal distance data 102, subject range data 103, and lens data 104, is converted into target position data 105 in order to drive the blurring motion compensation lens 2.

On the other hand, from outputs V1, V2 which were obtained via the AND converter 26 from the PSD 18, a calculation of (V1−V2)/(V1+V2) is performed by a calculating circuit 36. This signal passes through the lens position calculating unit 37, and is converted into actual position data 106 of the blurring motion compensation lens 2.

This actual position data 106 branches, and on the other hand, it is fed to a center bias calculating unit 38.

Figure 4:
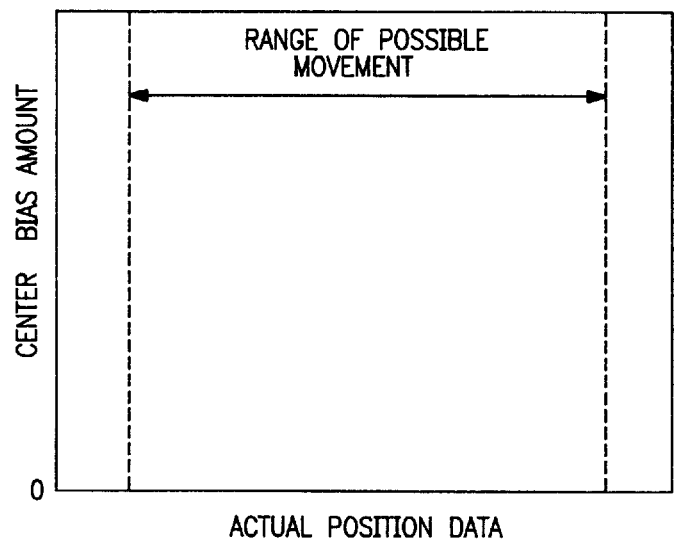
FIG. 4 is a graph which illustrates the operation of the center bias calculating unit of the first preferred embodiment of the present invention.

FIG. 4 is a graph which shows the calculation method of the center bias calculating unit 38 of the blurring motion compensation device according to this embodiment. In the Figure, the broken line shows the range of possible movement of the blurring motion compensation lens 2. In the case that the actual position data 106 is close to the center of the range of possible movement of the blurring motion compensation lens 2, the center bias amount becomes 0. When the actual position data 106 is close to the ends of the possible range, the center bias amount is also added. At the ends of the possible range, it is necessary for the center bias amount to be equal to, or greater than, the value obtained from the actual value data 106.

The output 106a of the center bias calculating unit 38 is subtracted from the target position data 105 of the blurring motion compensation lens 2. In the state of the blurring motion compensation lens 2 being close to the center, because the output of the center bias calculating unit 38 becomes 0, correction of the target position data 105 is not performed. However, if the blurring motion compensation lens 2 is far from the center, the output of the center bias calculating unit 38 becomes large, and the retraction amount of the blurring motion compensation lens 2 to the center also becomes large. Accordingly, when the center bias calculation unit 38 is operating, there is no output such that the target position data 105 of the blurring motion compensation lens 2 would be outside the range of movement.

Control unit 35 performs control such as to compensate for the deviation of target position data 105a corrected by the center bias calculating unit 38 and the actual position data 106, and outputs a suitable drive voltage 107. Moreover, operation or non-operation of the center bias calculating unit 38 is selected by release switch data 110. The center bias calculating unit 38, when a release full depression signal is confirmed, retains the last value, and its output is not altered until after the end of the exposure.

Figure 5A:
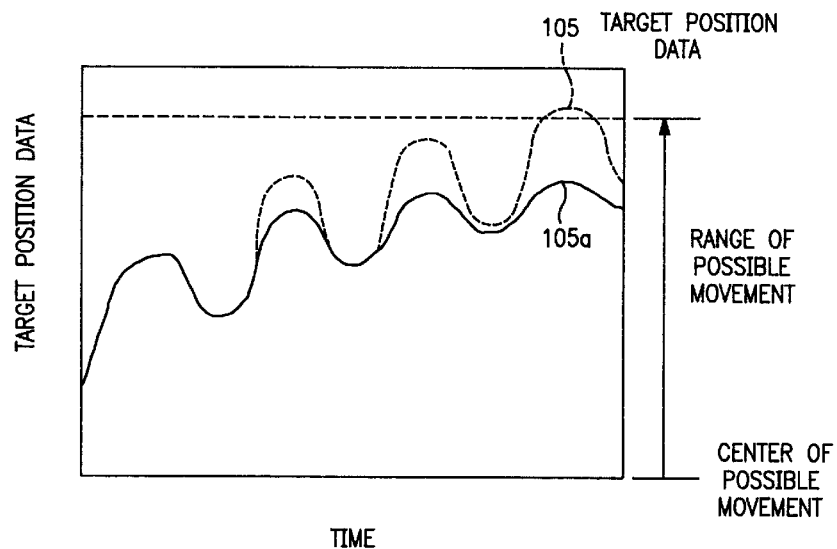
FIGS. 5(a)–5(b) are graphs showing the operation of the blurring motion compensation device of the first preferred embodiment of the present invention.
Figure 5B:
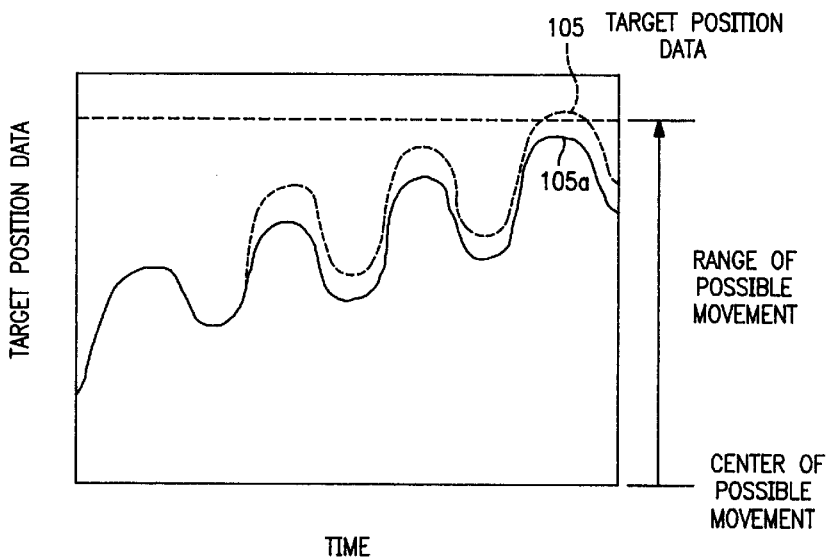

FIGS. 5(a)–5(b) are graphs which illustrate the operation of the center bias calculating unit 38 of a blurring motion compensation device according to the present embodiment.

FIG. 5(a) shows the target position data 105 during panning, and the corrected target position data 105a which has been corrected by the center bias calculating unit 38. In the Figure, the broken line shows the target position data 105, and the solid line shows the corrected target position data 105a which has been corrected by the center bias calculating unit 38. The corrected target position data 105a is corrected by being taken close to the range of possible movement, and a signal which exceeds the range of possible movement is restrained to be within the range of possible movement.

FIG. 5(b) shows the target position data 105 during an exposure and the corrected target position data 105a which has been corrected by the center bias calculating unit 38. Similarly, the broken line shows the target position data 105, and the solid line shows the corrected target position data 105a which has been corrected by the center bias calculating unit. Moreover, the arrow shows the timing of the full depression ON signal. The target position data 105, up to the full depression ON signal, is corrected based on the calculation result of the center bias calculating unit 38, but after the full depression ON signal, is held as the calculation result of the center bias calculating unit 38 directly before the full depression signal. An alteration of the calculation result is not performed. Accordingly, the waveform of the corrected target position data 105a, at and after the full depression ON signal, is just the shifted waveform of the target position data 105.

Figure 6:
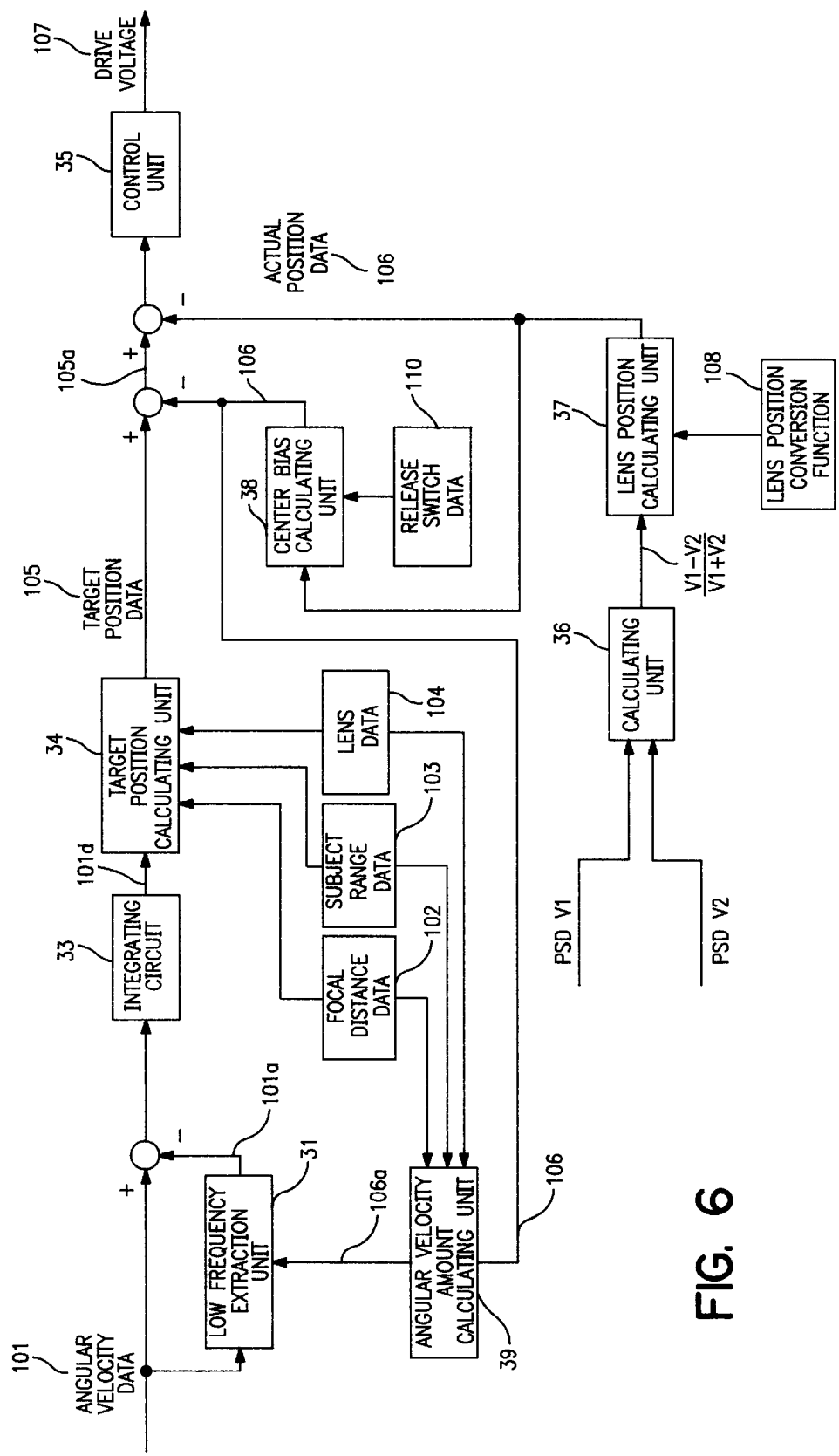
FIG. 6 is a block wiring diagram showing the blurring motion compensation device suitable for a camera according to a second preferred embodiment of the present invention.
Figure 7:
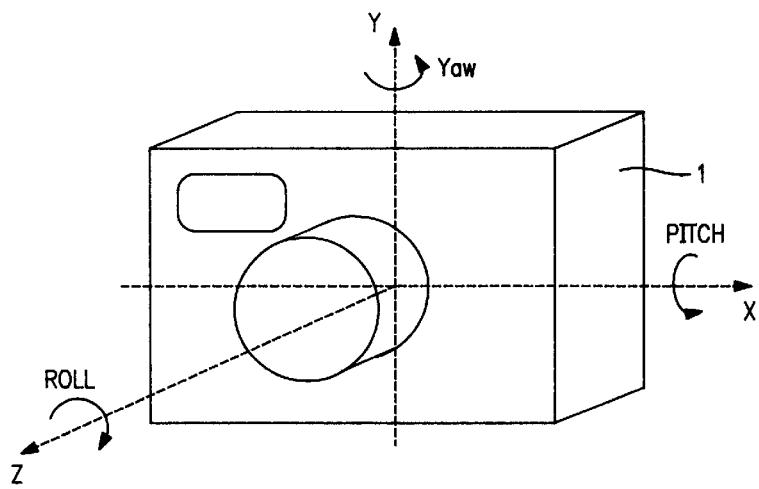
FIG. 7 is a schematic diagram which illustrates the image blurring motions of a camera.
Figure 8A:
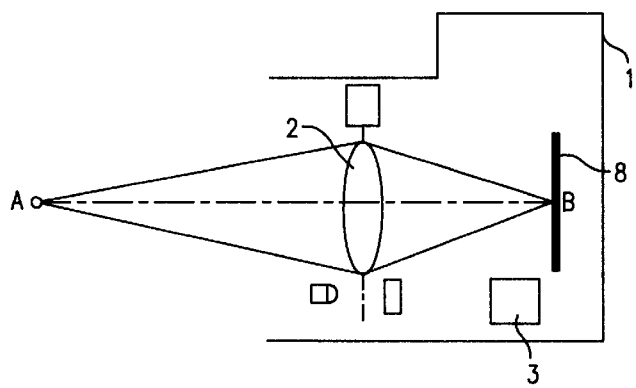
FIGS. 8(a) and 8(b) are schematic diagrams which illustrates the image blurring motions of a camera.
Figure 8B:
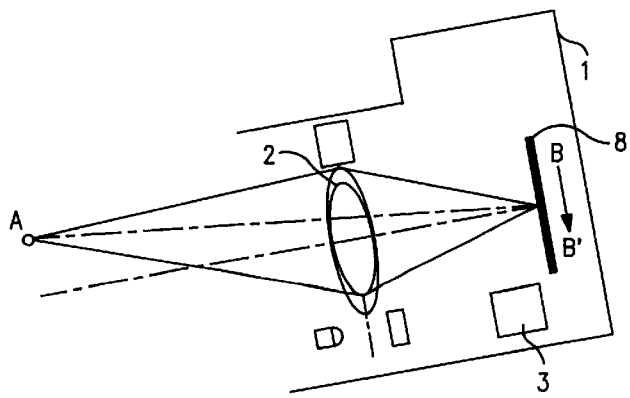
Figure 9:
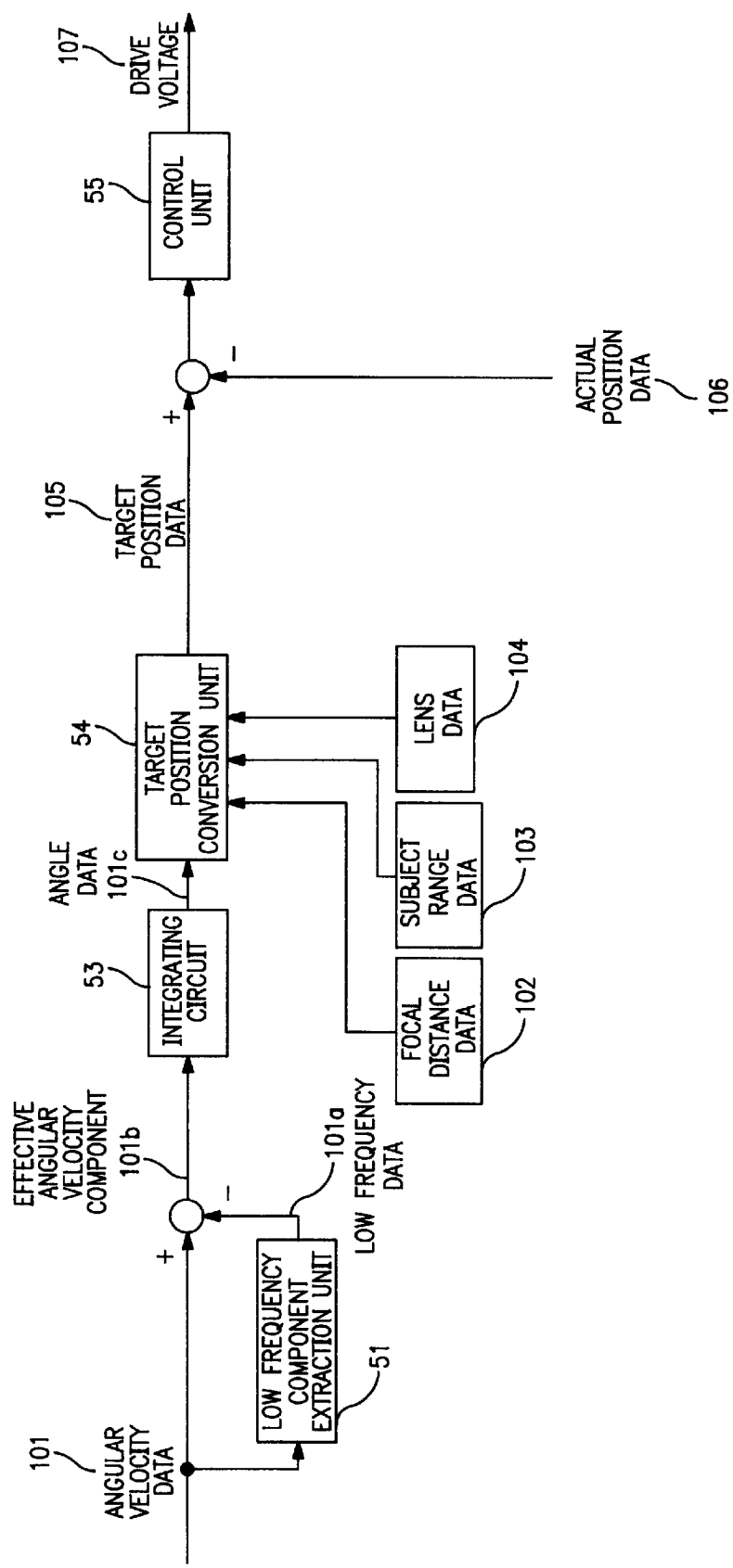
FIG. 9 is a block diagram showing an example of a prior art blurring motion compensation device.
Figure 10A:
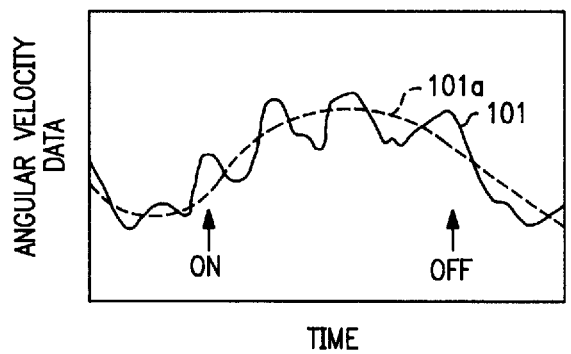
FIGS. 10(a)–10(d) illustrate graphs showing the operation of the blurring motion compensation device of FIG. 9.
Figure 10B:
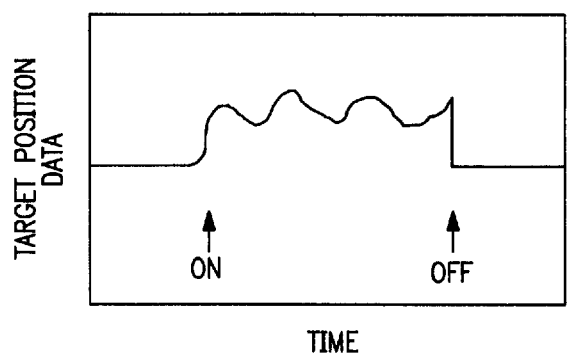
Figure 10C:
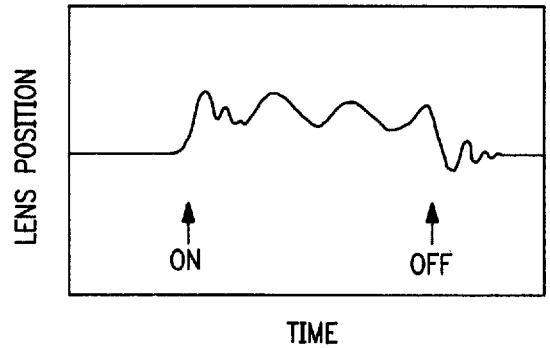
Figure 10D:
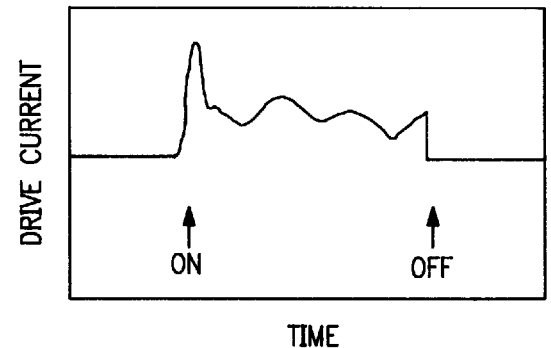

FIG. 6 is a block diagram showing a second embodiment of a blurring motion compensation device suitable for a camera according to the present invention. Parts performing a function similar to that in the first embodiment are given the same reference symbols.

The angular velocity data 101, taken in via an AND converter, initially has the low frequency component 101a of the blurring motion angular velocity extracted by a low frequency extraction unit 31. The effective angular velocity data 101b is obtained by subtracting the low frequency component 101a from the angular velocity data 101.

The angular velocity signal thus obtained is integrated by an integrating circuit 33, and converted into angle data 101d. This angle data 101d is converted into the target position data 105 in order to drive the blurring motion compensation lens 2 by the target position calculating unit 34, which performs a calculation with the inclusion of the focal distance data 102, subject range data 103, and lens data 104.

On the other hand, from the outputs V1, V2 which were obtained via the A/D converter 26 from the PSD 18, a calculation of (V1−V2)/(V1+V2) is performed by a calculating circuit 36. This signal passes through the lens position calculating unit 37, and is converted into the actual position data 106 of the blurring motion compensation lens 2. This actual position data 106 is sent to the center bias calculating unit 38, and its calculation result is subtracted from the target position data 105.

Moreover, the output of the center bias calculating unit 38 branches, and it is also output to an angular velocity amount calculating unit 39. The angular velocity amount calculating unit 39, based on the calculation result of the center bias calculating unit 38, and with the inclusion of the focal distance data 102, subject range data 103, and lens data 104, converts the calculation result to camera blurring motion angle data. Furthermore, the angular velocity compensation value 106a is found by differentiation.

This angular velocity compensation amount 106a is input to a low frequency component extraction unit 31, and subtracted from the angular velocity data 101. In the case that the blurring motion compensation lens 2 is close to the end of its range of possible movement, the angular velocity data 101 is corrected, and a retracting action to the center of the range of possible movement occurs.

In the state in which the blurring motion compensation device of this embodiment is caused to operate, when the photographer performs panning, the angular velocity of this panning is also extracted by the low frequency extraction unit 31. There is a retraction action of the blurring motion compensation lens to the center, but in detection of the low frequency component 101a, a time equal to the period of the frequency which is detected is necessary.

In the first embodiment, when the blurring motion compensation lens 2 comes to the end of its range of possible movement, by the control result of the target position data 105 determined by the center bias calculating unit 38, departing from the range of possible movement can be prevented, but the waveform of the target position data 105 becomes distorted.

Consequently, the second embodiment, in the case of the beginning of distortion of the waveform of the target position data, corrects the low frequency component 101a of the angular velocity data 101, and can instantly retract the blurring motion compensation lens 2 to the center of the range of possible movement. Accordingly, in the case that the photographer has effected panning of the camera, it is possible to follow the image in the viewfinder.

Moreover, the operation or non-operation of the center bias calculating unit 38 is selected by the release switch data 110. The center bias calculating unit 38, when the release full depression signal has been confirmed, holds its last output value, and this value does not alter during the exposure. At and after a full depression ON signal, the waveform of the corrected target position data is just the shifted waveform of the target position data, and at the time of an exposure the image blurring motion compensation can be performed with higher accuracy.

Moreover, in the first and second embodiments, a blurring motion compensation switch is independently supplied, but the shutter half depression signal may be substituted therefor.

According to the preferred embodiments of the present invention as described in detail above, because the target position signal is corrected towards the center of possible movement of the blurring motion compensation optical system, based on the detection data from detecting the position of the blurring motion compensation optical system, the movement of the image during panning can be made natural.

Furthermore, according to the preferred embodiments of the present invention, because the output of the low frequency extraction unit is corrected, based on the output of the center bias calculation unit, image blurring motion compensation can be performed with higher accuracy.

Also, according to the preferred embodiments of the present invention, the center bias calculating unit does not function during an exposure, and thus, the accuracy of the blurring motion compensation result can be preserved during the exposure.

Further, one of ordinary skill in the art will recognize that while the preferred embodiments have been shown and described as being used within an optical camera, they may be adapted for use in any device in which it is desirable to suppress blurring of an image formed by an optical system, for example, in camcorders, motion picture cameras, telescopes, binoculars, microscopes, range finding equipment, laser devices, fiber optic communication systems, various optical projection systems and CD mastering systems.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A motion compensation device comprising:
   a motion detection unit to detect motion;
   a motion compensation optical system to compensate for image motion;
   a position detecting unit to detect position data of the motion compensation optical system;
   a motion compensation drive unit to drive the motion compensation optical system;
   a motion compensation control unit to calculate, from output of the motion detection unit, a target position signal based on input lens data, subject range data, and focal distance data of the motion compensation optical system, and based on the target position signal, to control the motion compensation drive unit; and
   a center bias calculation unit to correct, based on the position data obtained from the position detecting unit, the target position signal towards a center of possible movement of the motion compensation optical system.

2. A motion compensation device according to claim 1, further comprising:
   a low frequency extraction unit to extract low frequency components from output of the motion detection unit; and
   an angular velocity compensation amount calculating unit to correct, based on output of the center bias calculation unit, output of the low frequency extraction unit.

3. A motion compensation device, according to claim 2, wherein the motion compensation device operates during exposure periods of a camera, and
   wherein the center bias calculation unit stops functioning during an exposure.

4. A motion compensation device, according to claim 1, wherein said motion compensation device compensates for blurring motion in a camera.

5. A method for driving a motion compensation optical system, comprising:
   inputting angular velocity data from at least one angular velocity sensor;
   extracting low frequencies from the angular velocity data to form effective angular velocity data;
   integrating the effective angular velocity data to form angle data;
   calculating target position data from said angle data;
   calculating corrected target position data by subtracting center bias data from said target position data; and
   subtracting actual position data from said corrected target position data to form a drive voltage.

6. A method according to claim 5, wherein the step of calculating the target position data from the angle data includes incorporating focal distance data, subject range data, and lens data.

7. A method according to claim 5, wherein the step of calculating corrected target position data includes controlling generation of the center bias data by using a release switch.

8. A method according to claim 5, wherein the step of calculating corrected target position data includes inputting the actual position data to a center bias calculating unit.

9. A method according to claim 5, wherein the step of subtracting the actual position data from the corrected target position data includes compensating for deviation of target position data corrected by the center bias data.

10. A motion compensation device comprising:

an angular velocity data calculating unit to calculate angular velocity data;

a low frequency extraction unit to extract low frequencies from the angular velocity data and thus form effective angular velocity data;

an integrating circuit to integrate the effective angular velocity data to form angle data;

a target position calculating unit to calculate target position data from the angle data;

a center bias calculating unit to calculate a center bias and to subtract the center bias from the target data to thus form corrected target position data; and a subtractor to subtract actual position data from the corrected target position data to form a drive voltage for driving a motion compensation lens unit.

11. A motion compensation device according to claim 10, wherein said center bias calculating unit is operated by a release switch.

* * * * *